United States Patent
Yoshida et al.

(10) Patent No.: US 11,851,546 B2
(45) Date of Patent: Dec. 26, 2023

(54) THERMOPLASTIC RESIN FILM AND GLASS PLATE-CONTAINING LAMINATE

(71) Applicant: SEKISUI CHEMICAL CO., LTD., Osaka (JP)

(72) Inventors: Shougo Yoshida, Kouka (JP); Atsushi Nohara, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/494,260

(22) PCT Filed: Mar. 30, 2018

(86) PCT No.: PCT/JP2018/014005
§ 371 (c)(1),
(2) Date: Sep. 13, 2019

(87) PCT Pub. No.: WO2018/182031
PCT Pub. Date: Oct. 4, 2018

(65) Prior Publication Data
US 2020/0130329 A1   Apr. 30, 2020

(30) Foreign Application Priority Data

Mar. 31, 2017 (JP) ................................. 2017-072881

(51) Int. Cl.

| | | |
|---|---|---|
| *C08K 3/013* | (2018.01) | |
| *B32B 17/10* | (2006.01) | |
| *B32B 27/20* | (2006.01) | |
| *B32B 27/30* | (2006.01) | |
| *B60J 3/00* | (2006.01) | |
| *C08K 3/04* | (2006.01) | |
| *C08K 5/103* | (2006.01) | |
| *C08K 5/3417* | (2006.01) | |
| *C08K 13/02* | (2006.01) | |

(52) U.S. Cl.
CPC .......... *C08K 3/013* (2018.01); *B32B 17/1011* (2013.01); *B32B 17/10036* (2013.01); *B32B 17/10651* (2013.01); *B32B 17/10743* (2013.01); *B32B 17/10761* (2013.01); *B32B 27/20* (2013.01); *B32B 27/306* (2013.01); *B60J 3/00* (2013.01); *C08K 3/04* (2013.01); *C08K 5/103* (2013.01); *C08K 5/3417* (2013.01); *C08K 13/02* (2013.01); *B32B 2264/10* (2013.01); *B32B 2605/006* (2013.01); *C08J 2329/14* (2013.01)

(58) Field of Classification Search
None
See application file for complete search history.

(56) References Cited

U.S. PATENT DOCUMENTS

| | | |
|---|---|---|
| 3,351,518 A | 11/1967 | Ryan |
| 5,322,875 A | 6/1994 | Dages |
| 5,772,750 A | 6/1998 | Tomiya et al. |
| 5,912,283 A * | 6/1999 | Hashizume ............ C09D 5/032 523/213 |
| 6,499,839 B1 * | 12/2002 | Busby ...................... B41J 2/175 347/100 |
| 7,537,654 B1 | 5/2009 | Gaynor et al. |
| 10,363,721 B2 | 7/2019 | Tsunoda et al. |
| 2003/0124379 A1* | 7/2003 | Reising .................. B05D 5/068 428/626 |
| 2010/0279150 A1 | 11/2010 | Hatta et al. |
| 2012/0052310 A1 | 3/2012 | Keller et al. |
| 2012/0162752 A1 | 6/2012 | Kitano et al. |
| 2012/0164457 A1 | 6/2012 | Fukatani et al. |
| 2015/0119508 A1 | 4/2015 | Park et al. |
| 2015/0323702 A1 | 11/2015 | Ueda et al. |
| 2017/0113441 A1 | 4/2017 | Tsunoda et al. |

FOREIGN PATENT DOCUMENTS

| | | | |
|---|---|---|---|
| CN | 1174862 A | 3/1998 | |
| CN | 101910084 A | 12/2010 | |
| CN | 102625785 A | 8/2012 | |
| CN | 102625786 A | 8/2012 | |
| CN | 104592668 A | 5/2015 | |
| CN | 106164008 A | 11/2016 | |
| EP | 0 346 199 A1 | 12/1989 | |
| EP | 0 426 446 A2 | 5/1991 | |
| EP | 0803545 A2 * | 10/1997 | ......... C09B 67/0016 |
| JP | 1-155970 A | 6/1989 | |
| JP | 3-146561 A | 6/1991 | |
| JP | 7-178861 A | 7/1995 | |
| JP | H09124425 | * 11/1995 | |
| JP | 2000352798 A | * 12/2000 | |

(Continued)

OTHER PUBLICATIONS

Akao et al., JP-2000352798-A, Dec. 19, 2000 (Year: 2000).*
Doi et al., JP H09124425, Nov. 6, 1995 (Machine translation) (Year: 1995).*
Basf, "Tinuvin® XT 850" technical information data sheet, Jul. 2012 (Year: 2012).*
Supplementary European Search Report for the Application No. EP 18 776 156.4 dated Jan. 27, 2021.
Written Opinion of the International Searching Authority (PCT/ISA/237) for Application No. PCT/JP2018/014005 dated Jul. 3, 2018 (English translation mailed Oct. 10, 2019).

(Continued)

*Primary Examiner* — Cheng Yuan Huang
(74) *Attorney, Agent, or Firm* — Cheng Law Group, PLLC

(57) ABSTRACT

Provided is a thermoplastic resin film with which a glass plate-including laminate that looks different in color tone depending on the direction or angle can be obtained. A thermoplastic resin film according to the present invention includes a thermoplastic resin and a pigment, and when the thermoplastic resin film is planarly viewed with a transmission electron microscope, a number of pigments having an aspect ratio of 3 or more and 50 or less is 3 or more and 100 or less in a rectangular region of 13 μm long and 18 μm wide.

15 Claims, 2 Drawing Sheets

(56) References Cited

FOREIGN PATENT DOCUMENTS

| JP | 2004-202988 | A | 7/2004 |
| JP | 2014-9258 | A | 1/2014 |
| JP | 2016-135873 | A | 7/2016 |
| KR | 10-1991-0000915 | A | 1/1991 |
| KR | 10-2016-0141742 | A | 12/2016 |
| WO | 2004/018197 | A1 | 3/2004 |
| WO | WO-2014/132866 | A1 | 9/2014 |
| WO | WO-2015/156273 | A1 | 10/2015 |

OTHER PUBLICATIONS

International Search Report for the Application No. PCT/JP2018/014005 dated Jul. 3, 2018.
Written Opinion of the International Searching Authority (PCT/ISA/237) for Application No. PCT/JP2018/014005 dated Jul. 3, 2018.
European Office Action for the Application No. 18 776 156.4 dated Oct. 18, 2021.
Korean Office Action for the Application No. KR 10-2019-7010231 dated Feb. 23, 2022.
"Car Sheet-Metal Processing and Painting Repair Technology", edited by Wu Xingmin—Beijing, 1st edition, National Defense Industry Press, Apr. 2010, p. 283.
The Second Office Action for the Application No. 201880009182.5 from The State Intellectual Property Office of the People's Republic of China dated Dec. 13, 2021.
Inoue, Atsuyuki, "Determination of Aspect Ratios of Clay-Sized Particles", Clay Science, 1995, vol. 9, pp. 259-274.
European Office Action for the Application No. EP 18 776 156.4 dated Dec. 15, 2022.
"Fundamentals of Carbon Black", Modern Dispersions, Inc., 2017, <https://www.moderndispersions.com/carbonblack>.
"What is a Safety Glass and How Does it Work?" by Adrian Bell, Autotrends Magazine, Mar. 28, 2023.
Ferro, "Quinacridone Red (PR122)", dated accessed: Jul. 7, 2023.
Non-Final Office Action for the U.S. Appl. No. 18/047,897 dated Jul. 13, 2023.

\* cited by examiner

[FIG. 1]
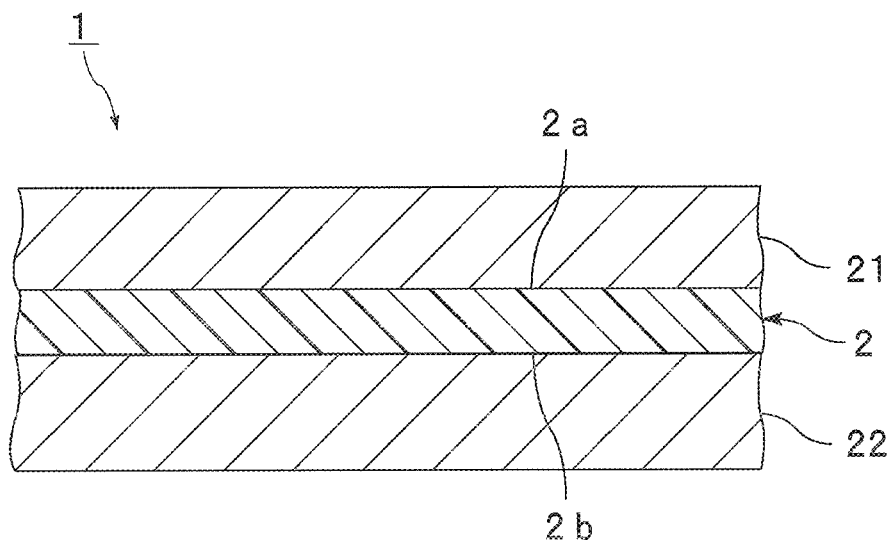
[FIG. 2]
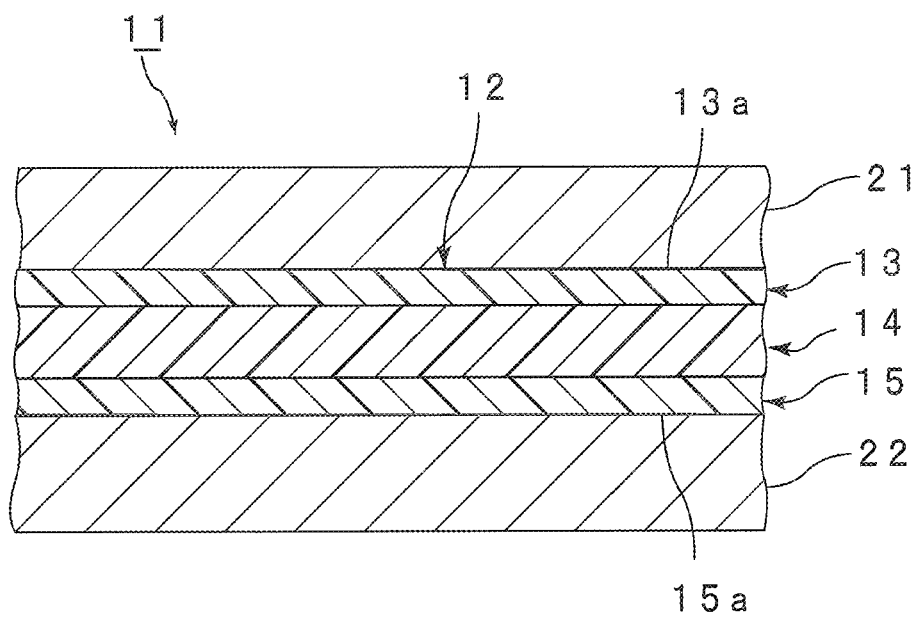

[FIG. 3]
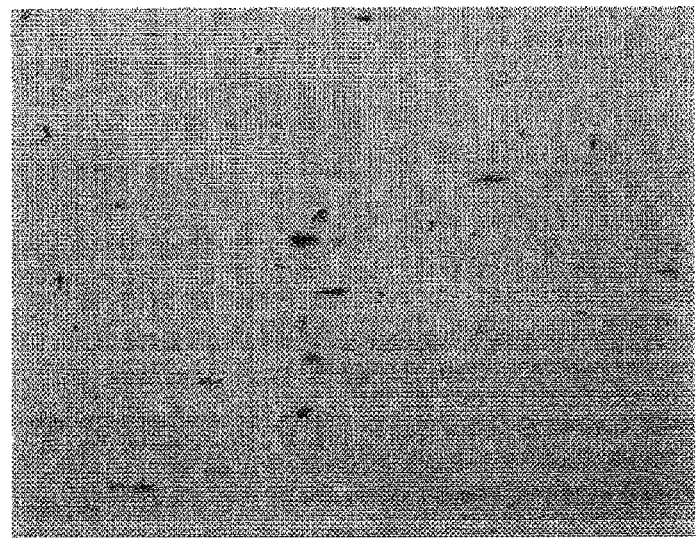

THERMOPLASTIC RESIN FILM AND GLASS PLATE-CONTAINING LAMINATE

TECHNICAL FIELD

The present invention relates to a thermoplastic resin film that is bonded to other members such as a glass plate and favorably used. Also, the present invention relates to a glass plate-including laminate prepared with the thermoplastic resin film.

BACKGROUND ART

A glass plate-including laminate in which a resin film is bonded to a glass plate is known. Among glass plate-including laminates, laminated glass is broadly used.

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching a thermoplastic resin film between a pair of glass plates. Besides the laminated glass, the thermoplastic resin film is sometimes bonded to a member other than a glass plate and used.

The thermoplastic resin film used for the laminated glass is disclosed, for example, in the following Patent Document 1.

The following Patent Document 1 discloses an interlayer film having low yellowing tendency, high transmittance to UV-A rays and visible light, and low transmittance to UV-B rays. The interlayer film contains a polyvinyl acetal, a plasticizer, and an oxanilide type compound which is a UV absorber. Patent Document 1 indicates that the interlayer film may contain a nonaromatic light stabilizer of HAS/HALS/NOR-HALS type, and that the interlayer film may contain a dye.

RELATED ART DOCUMENT

Patent Document

Patent Document 1: US2012/0052310A1

SUMMARY OF THE INVENTION

Problems to be Solved by the Invention

For the purpose of improving the design, colored glass plate-including laminates are commercially offered. In order to make a glass plate-including laminate be colored, a thermoplastic resin film can be colored. Also, in order to make a thermoplastic resin film be colored, a dye or a pigment or the like can be used. However, it is general that simple use of a dye or a pigment gives a glass plate-including laminate that looks to be one color tone.

It is an object of the present invention to provide a thermoplastic resin film with which a glass plate-including laminate that looks different in color tone depending on the direction or angle can be obtained. It is also an object of the present invention to provide a glass plate-including laminate prepared with the thermoplastic resin film.

Means for Solving the Problems

According to a broad aspect of the present invention, there is provided a thermoplastic resin film (sometimes abbreviated as "resin film" in this specification) including a thermoplastic resin, and a pigment, wherein when the thermoplastic resin film is planarly viewed with a transmission electron microscope, a number of pigments having an aspect ratio of 3 or more and 50 or less is 3 or more and 100 or less in a rectangular region of 13 μm long and 18 μm wide.

In a specific aspect of the resin film according to the present invention, an average direction of longitudinal directions of the pigments is parallel with a direction orthogonal to a thickness direction of the thermoplastic resin film, or inclined by 20° or less with respect to a direction orthogonal to a thickness direction of the thermoplastic resin film.

In a resin film according to the present invention, it is preferred that a polyvinyl acetal resin or an ionomer resin be contained as the thermoplastic resin.

It is preferred that the resin film according to the present invention contain a phthalocyanine compound, a quinacridone compound, an azo compound, a pentaphene compound, a dioxazine compound, a perylene compound, an indole compound or carbon black as the pigment. It is preferred that the phthalocyanine compound have a maximum absorption wavelength of 500 nm or more and 740 nm or less. The resin film according to the present invention may contain a phthalocyanine compound, or may contain a quinacridone compound, a perylene compound or an indole compound, or may contain carbon black as the pigment.

In a specific aspect of the resin film according to the present invention, when a glass plate-including laminate is obtained by sandwiching a thermoplastic resin film between two sheets of green glass having a thickness of 2 mm in accordance with JIS R3208, the obtained glass plate-including laminate has a haze value of 5% or less.

In a specific aspect of the resin film according to the present invention, the resin film includes a first surface layer and a second surface layer.

In a specific aspect of the resin film according to the present invention, the resin film includes an intermediate layer between the first surface layer and the second surface layer.

In a specific aspect of the resin film according to the present invention, the intermediate layer contains the pigment.

It is preferred that the resin film according to the present invention be a thermoplastic resin film that is bonded to a glass plate and used.

According to a broad aspect of the present invention, there is provided a glass plate-including laminate including a first glass plate; and the above-described thermoplastic resin film, the thermoplastic resin film being bonded to the first glass plate.

In a specific aspect of the glass plate-including laminate according to the present invention, the glass plate-including laminate includes the first glass plate as a first lamination glass member; the thermoplastic resin film; and a second lamination glass member, and the thermoplastic resin film is bonded to the first glass plate, the thermoplastic resin film is bonded to the second lamination glass member, and the thermoplastic resin film is arranged between the first glass plate and the second lamination glass member.

The glass plate-including laminate according to the present invention may be automotive side glass, may be automotive rear glass, or may be automotive roof glass.

Effect of the Invention

A thermoplastic resin film according to the present invention includes a thermoplastic resin, and a pigment. When the thermoplastic resin film according to the present invention is planarly viewed with a transmission electron microscope, a number of pigments having an aspect ratio of 3 or more and 50 or less is 3 or more and 100 or less in a rectangular region of 13 μm long and 18 μm wide. In the thermoplastic resin film according to the present invention, since the above-described configuration is provided, it is possible to obtain a glass plate-including laminate that looks different in color tone depending on the direction or angle.

BRIEF DESCRIPTION OF DRAWINGS

FIG. 1 is a sectional view showing a glass plate-including laminate prepared with a thermoplastic resin film according to one embodiment of the present invention.

FIG. 2 is a sectional view showing a modified example of a glass plate-including laminate prepared with the thermoplastic resin film according to one embodiment of the present invention.

FIG. 3 is a view showing an image when the thermoplastic resin film is planarly viewed with a transmission electron microscope.

MODE (S) FOR CARRYING OUT THE INVENTION

Hereinafter, the details of the present invention will be described.

The thermoplastic resin film according to the present invention (in the specification, also abbreviated as "resin film") is bonded to other members such as a glass plate and favorably used. The other member is an objective member to be bonded.

The resin film according to the present invention includes a thermoplastic resin, and a pigment.

In the resin film according to the present invention, when the resin film is planarly viewed with a transmission electron microscope (TEM), a number X of pigments having an aspect ratio of 3 or more and 50 or less is 3 or more and 100 or less in a rectangular region of 13 μm long and 18 μm wide.

In the present invention, since the above-described configuration is provided, it is possible to obtain a glass plate-including laminate that looks different in color tone depending on the direction or angle. In the present invention, it is possible to enhance the polychromatic visibility, it is possible to impart polychroism to the glass plate-including laminate, and it is possible to enhance the design.

The number X of pigments can be adjusted, for example, by controlling the adding mount of pigments at the time of production of the resin film.

From the viewpoint of further enhancing the color tone in polychroism, the number X of pigments is preferably 5 or more, more preferably 10 or more, and is preferably 80 or less, and more preferably 50 or less.

From the viewpoint of further enhancing the color tone in polychroism, it is preferred that an average direction of longitudinal directions of the pigments be parallel with a direction orthogonal to a thickness direction of the thermoplastic resin film, or inclined by 20° or less (angle of inclination) with respect to a direction orthogonal to a thickness direction of the thermoplastic resin film. From the viewpoint of further enhancing the color tone in polychroism, when the longitudinal direction of the pigment is inclined, the angle of inclination is preferably 15° or less, and more preferably 12° or less. In the later-described example, the angle of inclination was 10° or less.

The resin film may have a one-layer structure, may have a two or more-layer structure, may have a three or more-layer structure, and may have a four or more-layer structure. The resin film may have a two or more-layer structure, and may be provided with a first surface layer and a second surface layer. The resin film may have a three or more-layer structure, and may be provided with an intermediate layer between the first surface layer and the second surface layer. The resin film may be provided with two or more intermediate layers. The resin film may be provided with a first intermediate layer and a second intermediate layer.

When a glass plate-including laminate is obtained by sandwiching a thermoplastic resin film between two sheets of green glass having a thickness of 2 mm in accordance with JIS R3208, a total light transmittance of the obtained glass plate-including laminate is preferably 1% or more, and more preferably 4% or more.

From the viewpoint of light resistance, it is preferred that the total light transmittance of the surface layer be higher than the total light transmittance of the intermediate layer. From the viewpoint of light resistance, the total light transmittance of the surface layer is higher than the total light transmittance of the intermediate layer preferably by 10% or more, and more preferably by 30% or more.

The total light transmittance is a sum of the parallel light transmittance and the diffused light transmittance. The total light transmittance is measured in accordance with JIS R3106:1998. Specifically, a spectral transmittance is measured by a spectrophotometer while an object to be measured is brought into close and parallel contact with an opening of an integrating sphere so that all the transmitted rays are received by the integrating sphere. The total light transmittance means a visible light transmittance calculated from the spectral transmittance measured in this condition. Examples of the spectrophotometer include "U-4100" available from Hitachi High-Technologies Corporation.

From the viewpoint of increasing the transparency of a glass plate-including laminate, when a glass plate-including laminate is obtained by sandwiching a thermoplastic resin film between two sheets of green glass having a thickness of 2 mm in accordance with JIS R3208, the obtained glass plate-including laminate has a haze value of preferably 5% or less, more preferably 3% or less, and further preferably 2% or less.

Hereinafter, materials that can be used in the resin film according to the present invention are specifically described.
(Thermoplastic Resin)

The resin film contains a thermoplastic resin.

Examples of the thermoplastic resin include a polyvinyl acetal resin, an ionomer resin, an ethylene-vinyl acetate copolymer resin, an ethylene-acrylic acid copolymer resin, a polyurethane resin, a polyvinyl alcohol resin, and a cycloolefin resin. One kind of the thermoplastic resin may be used alone and two or more kinds thereof may be used in combination.

The resin film contains preferably a polyvinyl acetal resin or an ionomer resin, and more preferably a polyvinyl acetal resin as the thermoplastic resin. By using a polyvinyl acetal resin and a plasticizer together, the adhesive force of the resin film according to the present invention for a glass plate, a lamination glass member, other resin films or the like is further enhanced. It is preferred that the surface layer and the intermediate layer contain a polyvinyl acetal resin or an ionomer resin. One kind of each of the polyvinyl acetal resin and the ionomer resin may be used alone, and two or more kinds thereof may be used in combination.

For example, the polyvinyl acetal resin can be produced by acetalizing polyvinyl alcohol with an aldehyde. It is preferred that the polyvinyl acetal resin be an acetalized product of polyvinyl alcohol. For example, the polyvinyl alcohol can be produced by saponifying polyvinyl acetate. The saponification degree of the polyvinyl alcohol generally lies within the range of 70 to 99.9% by mole.

An average polymerization degree of the polyvinyl alcohol is preferably 200 or more, more preferably 500 or more, and is preferably 3500 or less, more preferably 3000 or less, and further preferably 2500 or less. When the average polymerization degree is the above lower limit or more, the penetration resistance of the glass plate-including laminate is further enhanced. When the average polymerization degree is the above upper limit or less, formation of a resin film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is 3 or more, the glass transition temperature of the resin film is sufficiently lowered.

The aldehyde is not particularly limited. In general, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably 15% by mole or more, and more preferably 18% by mole or more and is preferably 40% by mole or less, and more preferably 35% by mole or less. When the content of the hydroxyl group is the above lower limit or more, the adhesive force of the resin film is further enhanced. Moreover, when the content of the hydroxyl group is the above upper limit or less, the flexibility of the resin film is enhanced and the handling of the resin film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin is preferably 0.1% by mole or more, more preferably 0.3% by mole or more, and further preferably 0.5% by mole or more and preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the resin film and the glass plate-including laminate, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 60% by mole or more, and more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. First, from the total amount of ethylene groups in the main chain, the amount of ethylene groups to which the hydroxyl group is bonded, and the amount of ethylene groups to which the acetyl group is bonded are subtracted. The obtained value is divided by the total amount of ethylene groups in the main chain to determine a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups) the acetalization degree (the butyralization degree) and the acetylation degree be calculated from the results determined by a method in accordance with JIS K6728 "Testing methods for polyvinyl butyral".

(Plasticizer)

From the viewpoint of appropriately enhancing the adhesive force of a resin film, it is preferred that the resin film contain a plasticizer. It is preferred that the surface layer and the intermediate layer contain a plasticizer. By using a polyvinyl acetal resin and a plasticizer together, the adhesive force of the resin film according to the present invention for a glass plate, a lamination glass member, other resin films or the like is further enhanced. One kind of the plasticizer may be used alone, and two or more kinds thereof may be used in combination.

The plasticizer is not particularly limited. Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include, but are not particularly limited to, a glycol ester obtained by the reaction of a glycol with a monobasic organic acid, and the like. Examples of the glycol include triethylene glycol, tetraethylene glycol, tripropylene glycol, and the like.

Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include, but are not particularly limited to, an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include, but are not particularly limited to, tributoxyethyl phosphate, isodecyl phenyl phosphate, triisopropyl phosphate, and the like.

It is preferred that the plasticizer be a diester plasticizer represented by the following formula (1).

[Chemical 1]

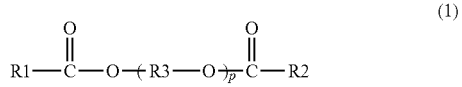

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate, and it is more preferred that the plasticizer include triethylene glycol di-2-ethylhexanoate.

The content of the plasticizer is not particularly limited. In the resin film, the content of the plasticizer relative to 100 parts by weight of the thermoplastic resin is preferably 25 parts by weight or more, and more preferably 30 parts by weight or more and is preferably 60 parts by weight or less, more preferably 50 parts by weight or less, further preferably 45 parts by weight or less, and further preferably 40 parts by weight or less. When the content of the plasticizer is the above lower limit or more, the penetration resistance of the glass plate-including laminate is further enhanced. When the content of the plasticizer is the above upper limit or less, the transparency of the resin film is further enhanced.

(Pigment)

For providing a colored resin film, the resin film contains the above-described pigment. From the viewpoint of effectively controlling excessive color irregularity, it is preferred that the intermediate layer contain the pigment. The surface layer may contain the pigment, or may not contain the pigment.

Which of dyes and pigments the coloring agent is categorized in can be discriminated according to the classification by the color index.

In the present specification, for coloring agents and the like that are not described in the color index, "pigment" and "dye" may be defined as follows. A polyvinyl butyral resin (the polymerization degree of polyvinyl alcohol of 1700, the content of the hydroxyl group of 30% by mole, the acetylation degree of 1% by mole, the butyralization degree of 69% by mole) is prepared. One hundred parts by weight of the polyvinyl butyral resin, 40 parts by weight of triethylene glycol di-2-ethylhexanoate (3GO), and a coloring agent in an amount of 0.015% by weight, relative to 100% by weight of the total amount of the polyvinyl butyral resin and 3GO are kneaded and extruded to give a resin film (single layer) having a thickness of 760 μm. Laminated glass is prepared with the resin film, and two sheets of clear glass (2.5 mm thick) having a visible light transmittance of 90% as measured in accordance with JIS R3106:1998, and when the obtained laminated glass has a haze value of 0.35% or more, the coloring agent is determined as a pigment. The coloring agent having a haze value of less than 0.35% is determined as a dye.

The pigment may be an organic pigment or may be an inorganic pigment. The organic pigment may be an organic pigment having a metal atom, or may be an organic pigment not having a metal atom. One kind of the pigment may be used alone, and two or more kinds thereof may be used in combination.

Examples of the organic pigment include a phthalocyanine compound, a quinacridone compound, an azo compound, a pentaphene compound, a dioxazine compound, a perylene compound, an indole compound and a dioxazine compound.

It is preferred that the color tone of the organic pigment be yellow, orange, red, violet, blue or green.

Examples of the inorganic pigment include carbon black, and iron oxide, zinc oxide and titanium oxide.

It is preferred that the resin film contain a phthalocyanine compound, a quinacridone compound, an azo compound, a pentaphene compound, a dioxazine compound, a perylene compound, an indole compound or carbon black as the pigment. The resin film may contain a phthalocyanine compound, or may contain a quinacridone compound, a perylene compound or an indole compound, or may contain carbon black as the pigment.

Examples of the phthalocyanine compound include phthalocyanine and derivatives of phthalocyanine. The phthalocyanine compound has a phthalocyanine skeleton.

The phthalocyanine compound preferably contains a vanadium atom or a copper atom, and more preferably contains a copper atom. The phthalocyanine compound may contain a vanadium atom. It is more preferred that the phthalocyanine compound be phthalocyanine containing a vanadium atom or a copper atom, or a derivative of phthalocyanine containing a vanadium atom or a copper atom, and it is more preferred that the phthalocyanine compound be phthalocyanine containing a copper atom or a derivative of phthalocyanine containing a copper atom. From the viewpoint of further enhancing the heat shielding properties of the resin film and the glass plate-including laminate, it is preferred that the phthalocyanine compound have a structural unit in which an oxygen atom is bonded to a copper atom.

From the viewpoint of further controlling excessive color irregularity, it is preferred that the phthalocyanine compound have a maximum absorption wavelength of 500 nm or more and 740 nm or less. From the viewpoint of further controlling excessive color irregularity, it is especially preferred that the phthalocyanine compound be a phthalocyanine compound of CAS No. 147-14-8.

Examples of the quinacridone compound include quinacridone and derivatives of quinacridone. The quinacridone has a quinacridone skeleton.

Examples of the perylene compound include perylene and derivatives of perylene. The perylene has a perylene skeleton.

The azo compound has an azo skeleton.

Examples of the pentaphene compound include pentaphene and derivatives of pentaphene. The pentaphene has a pentaphene skeleton.

Examples of the indole compound include indole and derivatives of indole. The indole has an indole skeleton.

Examples of the dioxazine compound include dioxazine and derivatives of dioxazine. The dioxazine has a dioxazine skeleton.

From the viewpoint of lowering the haze value, and effectively controlling excessive color irregularity, the content of the pigment in 100% by weight of the resin film is preferably 0.001% by weight or more, more preferably 0.01% by weight or more, and further preferably 0.03% by weight or more, and is preferably 0.4% by weight or less, more preferably 0.2% by weight or less, and further preferably 0.1% by weight or less.

When the resin film has a multilayer structure, the content of the pigment in 100% by weight of the layer containing the pigment is preferably 0.001% by weight or more from the viewpoint of lowering the haze value, and effectively controlling excessive color irregularity. When the resin film has a multilayer structure, the content of the pigment in 100% by weight of the layer containing the pigment is more preferably 0.01% by weight or more, and further preferably 0.03% by weight or more, and is preferably 0.4% by weight or less, more preferably 0.2% by weight or less, and further preferably 0.1% by weight or less, from the viewpoint of lowering the haze value, and effectively controlling excessive color irregularity.

(Light Stabilizer)

It is preferred that the resin film include a light stabilizer. By using the light stabilizer, discoloration is further suppressed and the visible light transmittance is less likely to lower even when the resin film is used over a long term or exposed to sunlight. One kind of the light stabilizer may be used alone and two or more kinds thereof may be used in combination.

From the viewpoint of further suppressing the discoloration, it is preferred that the light stabilizer be a hindered amine light stabilizer.

Examples of the hindered amine light stabilizer include hindered amine light stabilizers in which an alkyl group, an alkoxy group or a hydrogen atom is bonded to a nitrogen atom in the piperidine structure. From the viewpoint of further suppressing the discoloration, a hindered amine light stabilizer in which an alkyl group or an alkoxy group is bonded to a nitrogen atom in the piperidine structure is preferred. The hindered amine light stabilizer is preferably a hindered amine light stabilizer in which an alkyl group is bonded to a nitrogen atom in the piperidine structure, and also preferably a hindered amine light stabilizer in which an alkoxy group is bonded to a nitrogen atom in the piperidine structure.

As the hindered amine light stabilizer in which an alkyl group is bonded to a nitrogen atom in the piperidine structure, "Tinuvin765" and "Tinuvin622SF" available from BASF, and "ADK STAB LA-52" available from ADEKA, or the like can be recited.

As the hindered amine light stabilizer in which an alkoxy group is bonded to a nitrogen atom in the piperidine structure, "TinuvinXT-850FF" and "TinuvinXT-855FF" available from BASF, and "ADK STAB LA-81" available from ADEKA, or the like can be recited.

As the hindered amine light stabilizer in which a hydrogen atom is bonded to a nitrogen atom in the piperidine structure, "Tinuvin770DF" available from BASF, and "Hostavin N24" available from Clariant, or the like can be recited. From the viewpoint of further suppressing the discoloration, the light stabilizer has a molecular weight of preferably 2000 or less, more preferably 1000 or less, further preferably 700 or less.

From the viewpoint of further controlling excessive color irregularity and discoloration, the content of the light stabilizer in 100% by weight of the resin film is preferably 0.0025% by weight or more, and more preferably 0.025% by weight or more and is preferably 0.5% by weight or less, and more preferably 0.3% by weight or less.

When the resin film has a multilayer structure, the content of the light stabilizer in 100% by weight of the layer containing the light stabilizer is preferably 0.0025% by weight or more, and more preferably 0.025% by weight or more and is preferably 0.5% by weight or less, and more preferably 0.3% by weight or less, from the viewpoint of further controlling excessive color irregularity and discoloration.

(Metal Salt)

It is preferred that the resin film and the surface layer contain a magnesium salt, an alkali metal salt, or an alkaline earth metal salt (hereinafter, these are sometimes described collectively as Metal salt M). The intermediate layer may contain the metal salt M. By using the metal salt M, control of the adhesive force of the resin film according to the present invention for a glass plate, a lamination glass member or other resin film is further facilitated. One kind of the Metal salt M may be used alone, and two or more kinds thereof may be used in combination.

It is preferred that the Metal salt M contain as metal Li, Na, K, Rb, Cs, Mg, Ca, Sr or Ba. It is preferred that the metal salt included in the resin film be K or Mg. In this case, both K and Mg may be contained.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in the resin film, and the total of contents of Mg and K in the layer containing Mg or K (surface layer or the like) are preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, it is possible to control the adhesive force of the resin film for a glass plate, a lamination glass member or other resin film or the like more favorably.

(Ultraviolet Ray Screening Agent)

It is preferred that the resin film, the surface layer and the intermediate layer contain a ultraviolet ray screening agent. By using the ultraviolet ray screening agent, discoloration is further suppressed and the visible light transmittance is less likely to lower even when the resin film is used over a long term or used under high temperature. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include a metal-based ultraviolet ray screening agent (an ultraviolet ray screening agent containing a metal), a metal oxide-based ultraviolet ray screening agent (an ultraviolet ray screening agent containing a metal oxide), a benzotriazole-based ultraviolet ray screening agent (an ultraviolet ray screening agent having a benzotriazole structure), a benzophenone-based ultraviolet ray screening agent (an ultraviolet ray screening agent having a benzophenone structure), a triazine-based ultraviolet ray screening agent (an ultraviolet ray screening agent having a triazine structure), a malonic acid ester-based ultraviolet ray screening agent (an ultraviolet ray screening agent having a malonic acid ester structure), an oxanilide-based ultraviolet ray screening agent (an ultraviolet ray screening agent having an oxanilide structure), a benzoate-based ultraviolet ray screening agent (an ultraviolet ray screening agent having a benzoate structure), and the like.

Examples of the metal-based ultraviolet ray screening agent include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably a benzotriazole-based ultraviolet ray screening agent, a benzophenone-based ultraviolet ray screening agent, a triazine-based ultraviolet ray screening agent, or a benzoate-based ultraviolet ray screening agent, more preferably a benzotriazole-based ultraviolet ray screening agent or a benzophenone-based ultraviolet ray screening agent, and further preferably a benzotriazole-based ultraviolet ray screening agent.

Examples of the metal oxide-based ultraviolet ray screening agent include zinc oxide, titanium oxide, cerium oxide, and the like. Furthermore, with regard to the metal oxide-based ultraviolet ray screening agent, the surface thereof may be coated with any material. Examples of the coating material for the surface of the metal oxide-based ultraviolet ray screening agent include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the benzotriazole-based ultraviolet ray screening agent include 2-(2'-hydroxy-5'methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be a benzotriazole-based ultraviolet ray screening agent containing a halogen atom, and it is more preferred that the ultraviolet ray screening agent be a benzotriazole-based ultraviolet ray screening agent containing a chlorine atom, because those are excellent in ultraviolet ray absorbing performance.

Examples of the benzophenone-based ultraviolet ray screening agent include octabenzone ("Chimassorb 81" available from BASF Japan Ltd.), and the like.

Examples of the triazine-based ultraviolet ray screening agent include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the malonic acid ester-based ultraviolet ray screening agent include dimethyl 2-(p-methoxybenzylidene)malonate, tetraethyl-2,2-(1,4-phenylenedimethylidene)bis-malonate, 2-(p-methoxybenzylidene)-bis(1,2,2,6,6-pentamethyl-4-piperidinyl)malonate, and the like.

Examples of a commercial product of the malonic acid ester-based ultraviolet ray screening agent include Hostavin B-CAP, Hostavin PR-25, and Hostavin PR-31 (any of these is available from Clariant Japan K.K.).

Examples of the oxanilide-based ultraviolet ray screening agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide, and 2-ethyl-2'-ethoxy-oxanilide ("Sanduvor VSU" available from Clariant Japan K.K.).

Examples of the benzoate-based ultraviolet ray screening agent include 2,4-di-tert-butylphenyl-3,5-di-tert-butyl-4-hydroxybenzoate ("Tinuvin 120" available from BASF Japan Ltd.), and the like.

From the viewpoint of further controlling discoloration, and further controlling deterioration in visible light transmittance, the content of the ultraviolet ray screening agent in 100% by weight of the resin film and in 100% by weight of the layer containing the ultraviolet ray screening agent is preferably 0.1% by weight or more, more preferably 0.2% by weight or more, further preferably 0.3% by weight or more, and especially preferably 0.5% by weight or more. From the viewpoint of further controlling discoloration, and further controlling deterioration in visible light transmittance, the content of the ultraviolet ray screening agent in 100% by weight of the resin film and in 100% by weight of the layer containing the ultraviolet ray screening agent is preferably 2.5% by weight or less, more preferably 2% by weight or less, further preferably 1% by weight or less, and especially preferably 0.8% by weight or less.

(Oxidation Inhibitor)

It is preferred that the resin film, the surface layer and the intermediate layer contain an oxidation inhibitor. By using the oxidation inhibitor, discoloration is further suppressed and the visible light transmittance is less likely to lower even when the resin film is used over a long term or used under high temperature. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis [methylene-3-(3',5'-butyl-4-hydroxyphenyl)propionate] methane, 1,3,3-tris-(2-methyl-4-hydroxy-5-t-butylphenol) butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and "ADK STAB AO-40" available from ADEKA CORPORATION.

From the viewpoint of further controlling discoloration and further controlling deterioration in visible light transmittance, it is preferred that the content of the oxidation inhibitor in 100% by weight of the resin film and in 100% by weight of the layer containing the oxidation inhibitor be 0.1% by weight or more. Moreover, since an effect commensurate with the addition of an oxidation inhibitor is not attained, it is preferred that the content of the oxidation inhibitor be 2% by weight or less in 100% by weight of the resin film.

(Other Ingredients)

The resin film may contain additives such as a flame retardant, an antistatic agent, a moisture-resistance improving agent, a fluorescent brightening agent, and an infrared ray absorber, as necessary. One kind of these additives may be used alone, and two or more kinds thereof may be used in combination.

(Other Details of Resin Film)

From the viewpoint of effectively improving the sound shielding property, it is preferred that the intermediate layer contain a layer having a glass transition temperature of 10° C. or less.

The thickness of the resin film is not particularly limited. From the viewpoint of the practical aspect and the viewpoint of sufficiently enhancing the heat shielding property, the thickness of the resin film is preferably 0.1 mm or more, and more preferably 0.25 mm or more and is preferably 3 mm or less, and more preferably 1.5 mm or less. When the thickness of the resin film is the above lower limit or more, the penetration resistance of the glass plate-including laminate is further enhanced. When the thickness of the resin film is the above upper limit or less, the transparency of the resin film is further improved.

The method for producing the resin film is not particularly limited. As the method for producing the resin film, a conventionally known method can be used. For example, a production method including kneading the ingredients, and molding the resin film can be recited. A production method of extrusion-molding is preferred because the method is suitable for continuous production.

A method for the kneading is not particularly limited. Examples of such a method include methods using an extruder, a plastograph, a kneader, a Banbury mixer or a calender roll, or the like. A method of using an extruder is suitable, and a method of using a biaxial extruder is more suitable because such a method is suited for continuous production.

(Glass Plate-Including Laminate)

FIG. 1 is a sectional view showing one example of a glass plate-including laminate prepared with the thermoplastic resin film in accordance with one embodiment of the present invention.

A glass plate-including laminate 1 shown in FIG. 1 includes a resin film 2, a first lamination glass member 21 (first glass plate), and a second lamination glass member (which may be a second glass plate). The resin film 2 is a monolayer resin film. The resin film 2 is used for obtaining a glass plate-including laminate. The resin film 2 is a resin film that is bonded to a glass plate and used. The glass plate-including laminate 1 is laminated glass.

The resin film 2 is arranged and sandwiched between the first lamination glass member 21 and the second lamination glass member 22. The first lamination glass member 21 is layered on a first surface 2a (one surface) of the resin film 2. The second lamination glass member 22 is layered on a second surface 2b (other surface) opposite to the first surface 2a of the resin film 2.

FIG. 2 is a sectional view showing a modified example of a glass plate-including laminate prepared with the thermoplastic resin film in accordance with one embodiment of the present invention.

A glass plate-including laminate 11 shown in FIG. 2 includes a resin film 12, the first lamination glass member (first glass plate), and the second lamination glass member 22. The resin film 12 is a multilayer resin film. The resin film 12 is used for obtaining a glass plate-including laminate. The resin film 12 is a resin film that is bonded to a glass plate and used. The glass plate-including laminate 11 is laminated glass.

The resin film 12 has such a structure that a first layer 13 (first surface layer), a second layer 14 (intermediate layer) and a third layer 15 (second surface layer) are laminated in this order. In the present embodiment, the second layer 14 is a sound insulating layer. The first and the third layers 13, 15 are protective layers.

The resin film 12 is arranged and sandwiched between the first lamination glass member 21 and the second lamination glass member 22. The first lamination glass member 21 is layered on an outer surface 13a of the first layer 13. The second lamination glass member 22 is layered on an outer surface 15a of the second layer 15.

As described above, it suffices that the glass plate-including laminate according to the present invention includes a first glass plate, and a resin film according to the present invention. It is preferred that the resin film be arranged between the first lamination glass member (first glass plate) and the second lamination glass member.

Examples of the lamination glass member include a glass plate, a PET (polyethylene terephthalate) film, and the like. As the laminated glass, laminated glass in which a resin film is sandwiched between a glass plate and a PET film or the like, as well as laminated glass in which a resin film is sandwiched between two glass plates, is included. The laminated glass is a laminate provided with a glass plate, and it is preferred that at least one glass plate be used. It is preferred that the second lamination glass member be a glass plate or a PET film.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more and preferably 5 mm or less, and more preferably 3 mm or less. The thickness of the glass plate is preferably 1 mm or more and preferably 5 mm or less, and more preferably 3 mm or less. When the lamination glass member is a PET film, the thickness of the PET film is preferably 0.03 mm or more and is preferably 0.5 mm or less.

The method for producing the glass plate-including laminate is not particularly limited. By bonding the resin film with the first glass plate, it is possible to obtain a glass plate-including laminate. Furthermore, for example, the resin film is sandwiched between the first lamination glass member and the second lamination glass member, and then, passed through pressure rolls or subjected to decompression suction in a rubber bag, so that the air remaining between the first lamination glass member and the resin film, and between the second lamination glass member and the resin film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass which is a glass plate-including laminate can be obtained.

Each of the resin film and the glass plate-including laminate can be used for automobiles, railway vehicles, aircraft, ships, buildings and the like. Each of the resin film and the glass plate-including laminate can also be used for applications other than these applications. It is preferred that the resin film and the glass plate-including laminate be a resin film and a glass plate-including laminate for vehicles or for building respectively, and it is more preferred that the resin film and the glass plate-including laminate be a resin film and a glass plate-including laminate for vehicles respectively. Each of the resin film and the glass plate-including laminate can be used for a windshield, side glass, rear glass or roof glass of an automobile, and the like. The glass plate-including laminate according to the present invention may be automotive side glass, may be automotive rear glass, or may be automotive roof glass.

Hereinafter, the present invention will be described in more detail with reference to examples. The present invention is not limited only to these examples.

The following materials were used in examples and comparative examples.
Thermoplastic Resin:
(Polyvinyl Acetal Resin)
Polyvinyl butyral resin (PVB(1))(the polymerization degree of polyvinyl alcohol of 1700, the content of the hydroxyl group of 30% by mole, the acetylation degree of 1% by mole, the acetalization degree (the butyralization degree) of 69% by mole))

With regard to the polyvinyl butyral resin (PVB), the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.
(Plasticizer)
Triethylene glycol di-2-ethylhexanoate (3GO)
(Pigment)
Carbon black pigment (CAS No. 1333-86-4)
Copper phthalocyanine pigment (1) (CAS No, 147-14-8) (maximum absorption wavelength of 600 nm)
Copper phthalocyanine pigment (2) (CAS No. 12239-87-1)(maximum absorption wavelength of 640 nm)
Anthraquinone pigment (CAS No. 4051-63-2)
Perylene pigment (CAS No. 4948-15-6)
Method for Measuring Maximum Absorption Wavelength:
By mixing 0.002 parts by weight of a pigment to 100 parts by weight of chloroform, a chloroform solution was obtained. The obtained chloroform solution was put into a quartz cell for spectrophotometer, having an optical path length of 1.0 mm. Using a self-recording spectrophotometer ("U4100" available from Hitachi, Ltd.), 300 to 2500 nm transmittance was measured and a maximum absorption wavelength was determined. The maximum absorption wavelength refers to a wavelength at which the transmittance shows the minimum value, and a wavelength at which the minimum value is the smallest, namely refers to the largest absorption wavelength.
(Light Stabilizer)
Tinuvin 765 (available from BASF Japan Ltd., N-C (alkyl group) type)
(Metal Salt)
Mixture (1) (mixture of magnesium acetate and magnesium 2-ethylbutyrate)
(Ultraviolet Ray Screening Agent)
Tinuvin 326 (available from BASF Japan Ltd.)
(Oxidation Inhibitor)
BHT (2,6-di-t-butyl-p-cresol)

Example 1

Preparation of Composition for Forming Resin Film:
To PVB (1), 3GO, copper phthalocyanine pigment (1), Mixture (i), Tinuvin 765, Tinuvin 326, and BHT were added in the mixing amounts shown in Table 1, and the resultant mixture was sufficiently kneaded with a mixing roll, to obtain a composition.
Preparation of Resin Film:
By extruding the composition for forming a resin film with an extruder so that the number X of pigments was the number as shown in Table 1, a resin film having a monolayer structure (thickness: 780 μm) was prepared.
Preparation of Laminated Glass:

The obtained resin film was cut out into a piece of cm long×15 cm wide. Then the resin film was sandwiched between two sheets of green glass having a thickness of 2 mm in accordance with JIS R3208 (15 cm long×15 cm wide×2 mm thick), and vacuum-pressed with retention at 90° C. for 30 minutes by a vacuum laminator, to obtain laminated glass.

Examples 2 to 4 and Comparative Example 1

A resin film and laminated glass were obtained in the same manner as in Example 1 except that the kinds and the amounts of the ingredients of the composition were set to those shown in the following Table 1, and the concentration at the time of extrusion was varied so that the number X of pigments was set to that shown in the following Table 1.

Example 5

Preparation of Composition X for Forming Intermediate Layer:

To 100 parts by weight of PVB (1), 40 parts by weight of 3GO was added, and further, Tinuvin 765, Tinuvin 326, BHT, and Mixture (1) were added in the contents shown in Table 2 as the entire resin film (all layers), and the resultant mixture was sufficiently kneaded with a mixing roll, to obtain composition X.
Preparation of Composition Y for Forming Surface Layer:

To PVB (1), 3GO was added in the mixing amount shown in Table 2, and the resultant mixture was sufficiently kneaded with a mixing roll, to obtain composition Y.
Preparation of Resin Film:

By coextruding the composition X for forming an intermediate layer, and the composition Y for forming a surface layer using a coextruder so that the number X of pigments was as shown in the following Table 2, a resin film (760 μm thick, 100 cm wide) having a layered structure with a stack of a first surface layer/an intermediate layer/a second surface layer was prepared. At this time, the resin film was prepared so that the sectional shape is a wedge-like shape, and the thickness of the resin film decreases from one end part to the other end part, and the intermediate layer of 20 cm long in the width direction is embedded between the first and the third resin layers, and the intermediate layer has a maximum thickness of 300 μm.
Preparation of Laminated Glass:

The obtained resin film was cut out into a piece of 15 cm long×15 cm wide. At this time, the cutting was performed so that the thickest part of the intermediate layer is located in an end part of the laminated glass to be obtained, and the thickness of the intermediate layer decreases from the end part to the end part of the opposite side. Then the resin film was sandwiched between two sheets of green glass having a thickness of 2 mm in accordance with JIS R3208 (15 cm long×15 cm wide×2 mm thick, visible light transmittance of 85%), and vacuum-pressed with retention at 90° C. for 30 minutes by a vacuum laminator, to obtain laminated glass.

Examples 6 to 8 and Comparative Example 2

A resin film and laminated glass were obtained in the same manner as in Example 5 except that the kinds and the amounts of the ingredients of the composition were set to those shown in the following Table 2, and the thickness of each layer was set to that shown in the following Table 2, and the concentration at the time of extrusion was varied so that the number X of pigments was set to that shown in the following Table 2.

(Evaluation)
(1) Existing State of Pigment

The obtained resin film was subjected to the following operation. Using a ultramicrotome (LEICA EM UC7, available from Leica) of a diamond knife (DIATOME DRY, available from DIATOME) according to a cryo system (LEICA EM FCS, available from Leica), trimming and planarizing were conducted in the direction that is parallel with the flow direction at the time of production of the resin film and is perpendicular to the surface of the resin film as a pretreatment. By this operation, a ultrathin section was obtained as a measurement sample. Regarding the resin films obtained in Examples 5 to 8 and Comparative example 2, the thickest part of the intermediate layer of the obtained resin film was trimmed and planarized. Regarding the resin films obtained in examples and comparative examples, the flow direction at the time of production of the resin film is clear, however, for evaluating a resin film of which flow direction of the film at the time of production is unknown such as a resin film peeled off from a windshield, the flow direction of the film at the time production of the resin film can be found in the following method. Specifically, a resin film is cut out into a square shape, and stored in a thermostatic bath at 140° C. for 30 minutes, and the direction where the factor of shrinkage in the transverse direction and the longitudinal direction is the largest in the resin film can be confirmed as the flow direction. This owes to the fact that in general production of a resin film, the extending force most strongly applies in the flow direction of the film at the time of production, so that the resin film conversely shrinks most strongly in the flow direction of the film at the time of production under heating. Besides the above, when the resin film is a rolled body, the flow direction can be confirmed by the winding up direction of the rolled body. This owes to the fact that the rolled body of the resin film is wound up in the flow direction of the film at the time of production of the resin film, and thus the winding up direction of the rolled body and the flow direction of the film at the time of production of the resin film are identical with each other. TEM observation (Model HT7700, accelerating voltage 100 kV, available from Hitachi High-Technologies Corporation) and EDS measurement (Model JEM-2100F, available from JEOL Ltd., UTW Si (Li) semiconductor detector, beam diameter 0.2 nm, available from JEOL Ltd.) for evaluating the existing state of a pigment were conducted in the following manner. The number X of pigments having an aspect ratio of 3 or more and 50 or less in a rectangular region of 13 μm long and 18 μm wide was counted. The observation of image by TEM was conducted three times, and the result showing the largest number among the three observations was adopted. Composition of the pigment having an aspect ratio of 3 or more and 50 or less was evaluated by EDS. FIG. 3 shows an image when the thermoplastic resin film is planarly viewed with a transmission electron microscope.

(2) Measurement of Haze Value

A haze value of obtained laminated glass was measured using a haze meter ("TC-HIIIDPK" available from Tokyo Denshoku Co., Ltd.) in accordance with JIS K6714. Regarding the laminated glass obtained in Examples 5 to 8 and Comparative example 2, the haze value was measured at the thickest part of the intermediate layer of the obtained laminated glass.

(3) Total Light Transmittance

A total light transmittance (TvD) of the obtained laminated glass was measured in accordance with JIS R3106 (1998). The spectral transmittance was measured by a spectrophotometer ("U-4100" available from Hitachi High-Technologies Corporation) while the obtained laminated glass was brought into close and parallel contact with an opening of an integrating sphere so that all the transmitted rays are received by the integrating sphere. The visible light transmittance calculated from the obtained spectral transmittance was determined as a total light transmittance. Regarding the laminated glass obtained in Examples 5 to 8 and Comparative example 2, the total light transmittance was measured at the thickest part of the intermediate layer of the obtained laminated glass.

(4) Evaluation of Polychroism

The obtained laminated glass was irradiated with light from a position 100 cm apart from the glass using an artificial sunlight lamp "XC-100" available from SERIC. Whether or not the color tone of the laminated glass changes when the surface of the laminated glass irradiated with the light is rotated by 90 degrees in the planar direction of the glass was evaluated. The polychroism was judged according to the following criteria.

[Criteria for Judgment on Polychroism]

○: Color tone changed x: Color tone not changed

The details and the results are shown in the following Tables 1 and 2. In the following Tables 1 and 2, the content of the plasticizer in each layer indicates the content relative to 100 parts by weight of the thermoplastic resin in each layer. In the following Tables 1 and 2, the contents of the pigment, the light stabilizer, the ultraviolet ray screening agent, and the oxidation inhibitor indicate the contents in 100% by weight of each layer. In the following Tables 1 and 2, the total of the contents of Mg and K (ppm) indicates the concentration in each layer. In Tables 1 and 2, the number X of pigments is a number of pigments having an aspect ratio of 3 or more and 50 or less in a rectangular region of 13 μm long and 18 μm wide.

TABLE 1

| | | | Example 1 | Example 2 | Example 3 | Example 4 | Comparative Example 1 |
|---|---|---|---|---|---|---|---|
| Resin film | Thermoplastic resin | Kind | PVB(1) | PVB(1) | PVB(1) | PVB(1) | PVB(1) |
| | | Content (parts by weight) | 100 | 100 | 100 | 100 | 100 |
| | Plasticizer | Kind | 3GO | 3GO | 3GO | 3GO | 3GO |
| | | Content (parts by weight) | 40 | 40 | 40 | 40 | 40 |
| | Pigment | Kind 1 | Copper phthalocyanine pigment (1) | Copper phthalocyanine pigment (2) | Copper phthalocyanine pigment (1) | Copper phthalocyanine pigment (1) | Carbon black pigment |
| | | Content (% by weight) | 0.023 | 0.023 | 0.005 | 0.023 | 0.023 |
| | | Kind 2 | — | — | Carbon black pigment | Carbon black pigment | — |
| | | Content (% by weight) | — | — | 0.022 | 0.023 | — |
| | | Kind 3 | — | — | Anthraquinone pigment | Perylene pigment | — |
| | | Content (% by weight) | — | — | 0.0001 | 0.0004 | — |
| | Light stabilizer | Kind | Tinuvin 765 | Tinuvin 765 | Tinuvin 765 | Tinuvin 765 | Tinuvin 765 |
| | | Content (% by weight) | 0.03 | 0.03 | 0.03 | 0.03 | 0.03 |
| | Metal salt | Kind | Mixture (1) | Mixture (1) | Mixture (1) | Mixture (1) | Mixture (1) |
| | | Total of contents of Mg and K (ppm) | 60 | 60 | 60 | 60 | 60 |
| | Ultraviolet ray screening agent | Kind | Tinuvin 326 | Tinuvin 326 | Tinuvin 326 | Tinuvin 326 | Tinuvin 326 |
| | | Content (% by weight) | 0.15 | 0.15 | 0.15 | 0.15 | 0.15 |
| | Oxidation inhibitor | Kind | BHT | BHT | BHT | BHT | BHT |
| | | Content (% by weight) | 0.15 | 0.15 | 0.15 | 0.15 | 0.15 |
| Crystal structure | | Major axis/nm | 370 | 1230 | 295 | 180 | 90 |
| | | Minor axis/nm | 37 | 50 | 45 | 47 | 102 |
| | | Aspect ratio | 10 | 24.6 | 6.56 | 3.83 | 0.88 |
| | | Number X of pigments | 8 | 12 | 10 | 15 | 0 |
| | | Haze value (%) | 1.6 | 3.6 | 1.6 | 1.9 | 1.2 |
| | | Total light transmittance (%) | 38 | 37 | 17 | 6 | 38 |
| | | Polychroism | ○ | ○ | ○ | ○ | x |

TABLE 2

| | | | Example 5 | Example 6 | Example 7 | Example 8 | Comparative Example 2 |
|---|---|---|---|---|---|---|---|
| Interlayer | Thermoplastic resin | Kind | PVB(1) | PVB(1) | PVB(1) | PVB(1) | PVB(1) |
| | | Content (parts by weight) | 100 | 100 | 100 | 100 | 100 |
| | Plasticizer | Kind | 3GO | 3GO | 3GO | 3GO | 3GO |
| | | Content (parts by weight) | 40 | 40 | 40 | 40 | 40 |
| | Pigment | Kind 1 | Copper phthalocyanine pigment (1) | Copper phthalocyanine pigment (1) | Copper phthalocyanine pigment (1) | Copper phthalocyanine pigment (1) | Carbon black pigment |
| | | Content (% by weight) | 0.06 | 0.06 | 0.06 | 0.006 | 0.058 |
| | | Kind 2 | — | Carbon black pigment | Carbon black pigment | Carbon black pigment | — |

TABLE 2-continued

|  |  |  | Example 5 | Example 6 | Example 7 | Example 8 | Comparative Example 2 |
|---|---|---|---|---|---|---|---|
|  |  | Content (% by weight) | — | 0.058 | 0.058 | 0.027 | — |
|  |  | Kind 3 | — | — | Perylene pigment | Anthraquinone pigment | — |
|  |  | Content (% by weight) | — | — | 0.001 | 0.005 | — |
|  | Shape | Sectional shape | wedge-like shape | wedge-like shape | wedge-like shape | wedge-like shape | wedge-like shape |
|  |  | Length of interlayer in width direction (cm) | 20 | 20 | 20 | 20 | 20 |
|  |  | Maximum thickness (μm) | 300 | 300 | 300 | 300 | 300 |
|  |  | Minimum thickness (μm) | 0 | 0 | 0 | 0 | 0 |
| Surface layer | Thermoplastic resin | Kind | PVB (1) | PVB (1) | PVB (1) | PVB (1) | PVB (1) |
|  |  | Content (parts by weight) | 100 | 100 | 100 | 100 | 100 |
|  | Plasticizer | Kind | 3GO | 3GO | 3GO | 3GO | 3GO |
|  |  | Content (parts by weight) | 40 | 40 | 40 | 40 | 40 |
|  |  | Thickness per one layer (μm) | 230 | 230 | 230 | 230 | 230 |
| All layers | Light stabilizer | Kind | Tinuvin 765 | Tinuvin 765 | Tinuvin 765 | Tinuvin 765 | Tinuvin 765 |
|  |  | Content (% by weight) | 0.03 | 0.03 | 0.03 | 0.03 | 0.03 |
|  | Metal salt | Kind | Mixture (1) | Mixture (1) | Mixture (1) | Mixture (1) | Mixture (1) |
|  |  | Total of contents of Mg and K (ppm) | 60 | 60 | 60 | 60 | 60 |
|  | Ultraviolet ray screening agent | Kind | Tinuvin 326 | Tinuvin 326 | Tinuvin 326 | Tinuvin 326 | Tinuvin 326 |
|  |  | Content (% by weight) | 0.15 | 0.15 | 0.15 | 0.15 | 0.15 |
|  | Oxidation inhibitor | Kind | BHT | BHT | BHT | BHT | BHT |
|  |  | Content (% by weight) | 0.15 | 0.15 | 0.15 | 0.15 | 0.15 |
| Crystal structure |  | Major axis/nm | 390 | 980 | 280 | 250 | 120 |
|  |  | Minor axis/nm | 45 | 50 | 50 | 50 | 105 |
|  |  | Aspect ratio | 8.70 | 19.6 | 5.60 | 5.00 | 1.14 |
|  | Number X of pigments |  | 27 | 30 | 35 | 8 | 0 |
|  | Haze value (%) |  | 1.7 | 3.2 | 3.9 | 1.8 | 1.5 |
|  | Total light transmittance (%) |  | 37 | 6 | 4 | 35 | 38 |
|  | Polychroism |  | ○ | ○ | ○ | ○ | x |

EXPLANATION OF SYMBOLS

1: Glass plate-including laminate (Laminated glass)
2: Resin film
2a: First surface
2b: Second surface
11: Glass plate-including laminate (Laminated glass)
12: Resin film
13: First layer (first surface layer)
14: Second layer (intermediate layer)
15: Third layer (second surface layer)
13a: Outer surface
15a: Outer surface
21: First lamination glass member (First glass plate)
22: Second lamination glass member

The invention claimed is:

1. A thermoplastic resin film consisting of:
a thermoplastic resin;
a pigment having an aspect ratio of 5 or more and 50 or less, the pigment in the thermoplastic resin film consisting of only one kind of pigment, the only one kind of pigment having the aspect ratio of 5 or more and 50 or less;
optionally, a plasticizer;
optionally, a light stabilizer;
optionally, a metal salt;
optionally, an ultraviolet ray screening agent; and
optionally, an oxidation inhibitor;
wherein
a number of the pigments having the aspect ratio of 5 or more and 50 or less is 3 or more and 100 or less in a rectangular region of 13 μm long and 18 μm wide as determined by a planar view of the thermoplastic resin film with a transmission electron microscope.

2. The thermoplastic resin film according to claim 1, wherein an average direction of longitudinal directions of the pigments is parallel with a direction orthogonal to a thickness direction of the thermoplastic resin film, or inclined by 20° or less with respect to a direction orthogonal to a thickness direction of the thermoplastic resin film.

3. The thermoplastic resin film according to claim 1, containing a polyvinyl acetal resin or an ionomer resin as the thermoplastic resin.

4. The thermoplastic resin film according to claim 1, containing a phthalocyanine compound, a quinacridone compound, an azo compound, a pentaphene compound, a dioxazine compound, a perylene compound, an indole compound or carbon black as the pigment.

5. The thermoplastic resin film according to claim 4, containing a phthalocyanine compound as the pigment.

6. The thermoplastic resin film according to claim 4, wherein the phthalocyanine compound has a maximum absorption wavelength of 500 nm or more and 740 nm or less.

7. The thermoplastic resin film according to claim 4, containing a quinacridone compound, a perylene compound, or an indole compound as the pigment.

8. The thermoplastic resin film according to claim 4, containing carbon black as the pigment.

9. The thermoplastic resin film according to claim 1, wherein when a glass plate-including laminate is obtained by sandwiching a thermoplastic resin film between two sheets of green glass having a thickness of 2 mm in accordance with JIS R3208, the obtained glass plate-including laminate has a haze value of 5% or less.

10. The thermoplastic resin film according to claim 1, including a first surface layer, and a second surface layer.

11. The thermoplastic resin film according to claim 10, including an intermediate layer between the first surface layer and the second surface layer.

12. The thermoplastic resin film according to claim 11, wherein the intermediate layer contains the pigment.

13. The thermoplastic resin film according to claim 1, which is bonded to a glass plate and used.

14. The thermoplastic resin film according to claim 1, comprising the ultraviolet ray screening agent, the ultraviolet ray screen agent comprising at least one selected from the group consisting of platinum particles, particles in which the surface of platinum particles is coated with silica, palladium particles, and particles in which the surface of palladium particles is coated with silica.

15. The thermoplastic resin film according to claim 1, comprising the light stabilizer, the light stabilizer comprising a hindered amine light stabilizer in which an alkoxy group is bonded to a nitrogen atom in the piperidine structure.

* * * * *